United States Patent
Miklós et al.

(10) Patent No.: US 8,670,333 B2
(45) Date of Patent: Mar. 11, 2014

(54) POLICY ENFORCEMENT WITHIN AN IP NETWORK

(75) Inventors: György Miklós, Üröm (HU); Zoltán Richárd Turányi, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 821 days.

(21) Appl. No.: 12/160,615

(22) PCT Filed: Jan. 20, 2006

(86) PCT No.: PCT/EP2006/050330
§ 371 (c)(1),
(2), (4) Date: Nov. 24, 2009

(87) PCT Pub. No.: WO2007/082587
PCT Pub. Date: Jul. 26, 2007

(65) Prior Publication Data
US 2010/0284327 A1    Nov. 11, 2010

(51) Int. Cl.
*H04L 12/26* (2006.01)

(52) U.S. Cl.
USPC .......................................... 370/252; 370/392

(58) Field of Classification Search
None
See application file for complete search history.

(56) References Cited

U.S. PATENT DOCUMENTS

| | | | |
|---|---|---|---|
| 7,230,951 B2 * | 6/2007 | Mizell et al. | 370/401 |
| 7,644,171 B2 * | 1/2010 | Sturniolo et al. | 709/230 |
| 7,821,926 B2 * | 10/2010 | Hannel et al. | 370/229 |
| 2003/0108015 A1 | 6/2003 | Li | |
| 2004/0208153 A1 | 10/2004 | Mizell et al. | |
| 2005/0239458 A1 | 10/2005 | Hurtta | |

* cited by examiner

*Primary Examiner* — Rhonda Murphy

(57) ABSTRACT

A method and network node for generating and applying policy rules in an IP network. A Policy Enforcement Function (PEF) is implemented in a node such as a Gateway GPRS Service Node (GGSN) routing packet flows to and from network users. An Application Function (AF) determines source and destination addressing information for a packet flow and sends the information to a Policy and Charging Decision Function in a Policy and Charging Control Function (PCRF) having access to service and mobility policies for network users. The PCRF generates policy rules based on the addressing information and the appropriate service and mobility policies. The PCRF sends the policies rules to the PEF for application to the traffic flow.

15 Claims, 7 Drawing Sheets

| Uplink (40 bytes) | Downlink (40 bytes) |
|---|---|
| IP header<br>Source: MN home address<br>Dest: CN home address | IP header<br>Source: CN home address<br>Dest: MN home address |
| Transport header<br>Source Port number<br>Destination Port number | Transport header<br>Source Port number<br>Destination Port number |

Figure 2

| Uplink (40 bytes) | Downlink (40 bytes) |
|---|---|
| IP header<br>Source: MN care-of address<br>Dest: CN home address | IP header<br>Source: CN home address<br>Dest: MN care-of address |
| Transport header<br>Source Port number<br>Destination Port number | Transport header<br>Source Port number<br>Destination Port number |

Figure 3

| Uplink (40 bytes) | Downlink (40 bytes) |
|---|---|
| IP header<br>Source: MN Care-of address<br>Dest: CN Care-of address | IP header<br>Source: CN Care-of address<br>Dest: MN Care-of address |
| Type 2 Routing header<br>CN Home Address | Home Address Dest. Option<br>CN Home Address |
| Transport header<br>Source Port number<br>Destination Port number | Transport header<br>Source Port number<br>Destination Port number |

Figure 4

| HA address | CN HoA | CN CoA | Packet type | Action | Priority |
|---|---|---|---|---|---|
| X | <any> | <any> | <any> | Allow | 1 |
| <any> | Y-Z | <any> | #2, #3, #6, #7 | Allow | 2 |
| <any> | <any> | <any> | #1, #4, #5 | Allow | 3 |
| <any> | <any> | <any> | <any> | Drop | 4 |

| MN HoA | MN CoA | HA address | CN HoA | CN CoA | P. type | transp. | MN port | CN port | Action | Priority |
|---|---|---|---|---|---|---|---|---|---|---|
| A-MN | AC-MN | X | A-CN | <any> | <any> | T | P-MN | P-CN | Allow | 1 |
| A-MN | AC-MN | <any> | A-CN | <any> | #2,3,6,7 | T | P-MN | P-CN | Allow | 2 |
| A-MN | AC-MN | <any> | A-CN | <any> | #1,4,5 | T | P-MN | P-CN | Allow | 3 |
| A-MN | AC-MN | <any> | A-CN | <any> | <any> | T | P-MN | P-CN | Drop | 4 |

Figure 11

| MN HoA | MN CoA | HA address | CN HoA | CN CoA | P. type | transp. | MN port | CN port | Action | Priority |
|---|---|---|---|---|---|---|---|---|---|---|
| A-MN | AC-MN | X | A-CN | <any> | <any> | T | P-MN | P-CN | Allow | 1 |
| A-MN | AC-MN | <any> | A-CN | <any> | #1,4,5 | T | P-MN | P-CN | Allow | 3 |
| A-MN | AC-MN | <any> | A-CN | <any> | <any> | T | P-MN | P-CN | Drop | 4 |

Figure 12

POLICY ENFORCEMENT WITHIN AN IP NETWORK

FIELD OF THE INVENTION

The present invention relates to policy enforcement within an IP network and in particular, though not necessarily, to policy enforcement in respect of a mobile node.

BACKGROUND TO THE INVENTION

Mobile IP is a mechanism for maintaining transparent network connectivity to and from a Mobile Node (MN), such as a mobile terminal or telephone, over an IP based network whilst the Mobile Node is roaming within or across network boundaries. Mobile IP enables a Mobile Node (or rather user) to be addressed by a fixed IP address (a "Home Address") allocated by its home network, regardless of the network to which it is currently physically attached. The home address causes all traffic sent to the home address to be routed through the home network. Ongoing network connections to and from a Mobile Node can be maintained even as the Mobile Node is moving from one subnet to another. Mobile IP can be implemented using IP version 4 (IPv4) or IP version 6 (IPv6), although IPv6 is generally preferred as IPv4 has a number of limitations in a mobile environment. The IPv6 protocol is specified in RFC 2460, whilst Mobile IP using IPv6 is specified in IETF RFC 3775, 'Mobility Support in IPv6'.

According to Mobile IPv6, a Mobile Node is always reachable via its Home Address. However, while away from its home IP subnet (Home Subnet), a Mobile Node is also associated with a Care-of Address which indicates the Mobile Node's current location. The association of the Mobile Node's Home Address and the Care-of Address is known as a "Binding". A router in the Home Subnet, known as the "Home Agent", maintains a record of the current Binding of the Mobile Node. The Mobile Node can acquire its Care-of Address through a conventional IPv6 mechanism called "auto-configuration" within the visited IP subnet.

Any node with which a Mobile Node is communicating is referred to as a "Correspondent Node". The Correspondent Node can itself be either mobile or stationary. There are two possible modes for sending communications between the Mobile Node and the Correspondent Node.

The first mode, referred to as bidirectional tunneling, does not require Mobile IPv6 support from the Correspondent Node and is available even if the Mobile Node has not registered its current Binding with the Correspondent Node. IP packets from the Correspondent Node are routed to the Home Agent and then tunneled to the Mobile Node. Packets to the Correspondent Node are tunneled from the Mobile Node to the Home Agent ("reverse tunneled") and then routed normally from the Home Network to the Correspondent Node. In this mode, the Home Agent intercepts any IPv6 packets addressed to the Mobile Node's Home Address and each intercepted packet is tunneled to the Mobile Node's primary Care-of Address. This tunneling is performed using IPv6 encapsulation.

The second mode, referred to as route optimization, requires the Mobile Node to register its current binding at the Correspondent Node. This is done using a Binding Update message sent from the Mobile Node to the Correspondent Node (which the Correspondent Node acknowledges with a Binding Update Acknowledgement message). The Binding Update message contains as its destination address the address of the Correspondent Node. The source address of the message is the Care-of Address of the Mobile Node, whilst the home address of the Mobile Node is contained within a home address field of the message header. Route optimisation requires the inclusion of a routing header (a type 2 routing header) in the packet headers, indicating that the packets must be dealt with in a special way.

In order to enhance security of the Optimised Routing process, a "proof-of-address" mechanism may be employed. One such mechanism requires that, prior to issuing a (first) Binding Update message, a roaming Mobile Node send to a Correspondent Node a first message (HoTI) to the Correspondent Node employing route optimisation and a second message (CoTI) not employing route optimisation. The second message travels via the Home Agent whilst the second does not. The Correspondent Node replies to the first message with a first part of a random number generated by the Correspondent Node, and replies to the second message with a second part of the random number. The Mobile Node will only receive both parts of the random number if it has given both a valid Care-of Address and a valid Home Address. When the Binding Update is subsequently sent to the Correspondent Node, the Mobile Node includes both parts of the random number in the message to prove ownership of the Care-of and Home Addresses.

Once implemented, Route Optimisation allows the Mobile Node to send packets directly to the Correspondent Node. The Care-of Address is included as the source address in these "outgoing" packets. This is done by the Mobile IP protocol layer at the Mobile Node, which replaces the home address with the Care-of Address as the source address in outgoing packets. The Home Address is included in a further header field. The Mobile IP protocol layer at the Correspondent Node screens incoming mails by comparing the source addresses of the packets with Care-of Addresses held in its binding cache. If a match is found, the Care-of Address is replaced with the corresponding Home address, in the source address field, before passing the message to higher layers. Transit through the home network is thus avoided.

Considering the reverse direction, packets from the Correspondent Node can be routed directly to the Care-of Address of the Mobile Node. When sending a packet to an IPv6 destination, the Correspondent Node checks its cached bindings for an entry for the packet's destination address. If a cached binding for this destination address is found, the node substitutes the destination address for the corresponding Care-of Address, whilst including the destination address (i.e. the Home address) in a further header field. Upon receipt of a packet at the Mobile Node, the Mobile IP protocol layer replaces the Care-of Address in the destination field with the home address of the Mobile Node. The packet is then passed to higher protocol layers. Again, transit through the home network is avoided.

Routing packets directly to a Mobile Node's Care-of Address ensures that the shortest communication path is used. It also eliminates congestion at the Mobile Node's Home Agent, whilst reducing the impact of any possible failure of the Home Agent or networks on the path to and from the home agent. Route optimisation is, from the point of view of a user's home network, an example of "local breakout" from the access network used by the user. Another example of local breakout may be the case where a user "connects" directly to a Correspondent Node without using Mobile IP to handle mobility.

An important function of any mobile core network is the enforcement of service level policies. These policies dictate, inter alfa, what particular users may and may not do, and what they will be charged. Another policy might dictate the Quality of Service (QoS) that particular users will receive. Service level policies, which might be thought of as general policy statements, are enforced using detailed policy "rules". A single policy may require a set of policy rules. Each policy rule will comprise a first subject part identifying the packets that the policy rule will be applied to, and a second action part. The subject part may in some cases be a packet filter. Policy rules are installed into a node through which all traffic of the users pass or into multiple nodes, which collectively handle all traffic of the user.

In the case of 3GPP, it is envisaged that policing and charging functionality will be controlled from a so-called Policy and Charging Rules Function (PCRF) logical node, based on signaling from Application Functions (AF) providing high level services to users. Consider for example the IP Multimedia Subsystem (IMS) which is an architecture designed to provide access to a range of multimedia services via a 3G network. This architecture is illustrated in FIG. 1. When a call is set up over the IMS, the IMS Proxy Call/State Control Function (P-CSCF) acts as AF from a policy and charging point of view and informs the PCRF of the new session. In particular, the P-CSCF sends to the PCRF a descriptor of the IP flow, and an abstract definition of the QoS to apply. The PCRF has installed into it, for each user, a policy which describes how packet flows for that user are to be handled, i.e. allowed/denied services, charges, actual QoS, etc. [This may be installed manually into the PCRF or may be installed remotely, e.g. by a user's home network where the PCRF is located in a "visited" network.]

Considering this scenario in more detail, the AF will send to the PCRF a flow descriptor in the form of a five-tuple vector containing: (1) IP source address, (2) IP destination address, (3) an identification of the used transport protocol (e.g., TCP or UDP), (4) source port number and (5) destination port number. The PCRF applies the policy to this vector to generate a set of policy rules. For example, the policy may specify the charge and QoS to be applied to a call between the IP addresses and port numbers contained in the vector. The resulting rules will contain the five tuple vector as the subject part and the appropriate charging and QoS actions in the action part. The PCRF installs the policy rules into the traffic node at which the rules will be enforced. If the addresses/port numbers of a packet passing through the enforcement node match the filter part of a rule, the action specified at that rule is carried out. The traffic node is referred to hare as the Policy Enforcement Function (PEF) and, in the case of a cellular network incorporating GPRS, is usually located in a GPRS Gateway Support Node (GGSN), or an evolution of the GGSN.

SUMMARY OF THE INVENTION

With the introduction of Mobile IP, in addition to the service policies (i.e. charging, QoS, etc) outlined above, the PCRF may have installed into it a mobility policy. The mobility policy may specify, for example, whether or not a particular user is able to use Mobile IP at all and, if so, whether and to whom route optimisation can be implemented. Mobility policy may be specified by the home network of a user, by the operator of the access network, or by a combination of both.

By way of example, a mobility policy for a particular user may consist of a set of policy "statements", with each statement specifying a range of Correspondent Node IP addresses and the route optimisation policy for that range. A first range of IP addresses may correspond to IP addresses within the domain of the access network, and for which route optimisation is allowed. A second range may specify IP addresses within the domain of a user's home network and for which route optimisation is also allowed, whilst a third range may specify all other IP addresses for which route optimisation is not allowed. The policy rules generated at the PCRF and enforced at the PEF must implement this mobility policy, as well as implementing the service policy.

In order to facilitate interworking with non-mobility aware applications, a flow specification defined by the AF will contain the home IP address of the mobile node and of a Correspondent Node (CN), whereas in the case of Mobile IPv6 the actual IP addresses contained within an IP packet (and passing through the GGSN) may be differently organised due to MIP options and tunnel headers. In order to filter packets at the PEF based upon, for example, the CN address, the GGSN needs to look at one or more of the IP source/destination address of the IP header, the IP source/destination address of a nested IP header, a Home IP Address destination option, or a Type 2 Routing header, depending upon the actual packet format. In addition, to manage the routing variability, MIP mechanisms themselves may need policing, e.g., the set of Home Agents permitted or the set of CNs to towards which route optimization is allowed.

A method is needed that can:
allow filtering to work with or without MIPv6 encapsulation including tunneling and route optimization (both by the correspondent node and the mobile node itself);
permit efficient policing of the MIPv6 mechanisms, e.g., allow route optimization only towards certain correspondents, limit the set of Home Agents, etc.; and
keep the existing AF mobility unaware.

According to a first aspect of the present invention there is provided a method of generating and applying a set of policy rules for enforcement by a policy enforcement function at a node of a communication network, said node routing packet flows to and from users of the network, the method comprising:
at a service level control function, determining source and destination addressing information for a packet flow to be transported through said node;
sending said determined addressing information to a policy rules generating function, the policy rules generating function maintaining or having access to service and mobility policies for users of the communication system;
at the policy rules generating function generating said set of policy rules on the basis of the source and destination addressing information and the appropriate service and mobility policies; and
sending the generated set of policy rules to the policy enforcement function, and applying the set of policy rules to traffic flows.

Embodiments of the present invention allow the service level control function to be mobility policy agnostic. The addressing information provided by the service level control function is equally useable by networks which provide for Mobile IP and those which do not.

Typically, said service policy is a policy which takes no account of mobility (e.g. IP mobility).

Said mobility policy may be a policy which defines users' access to Mobile IP. In particular, the mobility policy may specify for a user those Correspondent Nodes with which the user may or may not employ route optimisation. The mobility policy may specify Home Agents via which the user may or may not route Mobile IP traffic. The mobility policy may specify packet types which may be used with Mobile IP.

In an embodiment of the invention, said service level control function may be located within a node of an IP Multimedia Subsystem, e.g. a P-CSCF, whilst said policy enforcement function may be located with a GGSN of a cellular telephone network. The policy rules generating function may be a standalone node.

Said source and destination addressing information provided by the service level control function comprises at least the source and destination addresses of the packet flow. It may also comprise the port numbers at the source and destination address sides. The service level control function may additionally identify the used transport protocol to the policy rules generating function, the policy rules generating function using this information to generate the policy rules.

The policy rules generating function may comprise a first part for applying said service policies to the received addressing information to generate a set of service rules, and a second part for applying the mobility policy to the service rules to generate said set of policy rules. More particularly, said second part extends the service rules to take into account Mobile IP addressing formats. For example, whilst the service rules may contain source and destination address for the IP flow, each policy rules may contain the home and care-of-address of the user for whom a policy is being applied, Correspondent Node home and care-of-addresses or address ranges, and an action for packets matching these address conditions. A policy rule may also specify allowed or disallowed Home Agent addresses and packet types.

A policy rule may comprise the following fields:
Mobile Node home address;
Mobile Node care-of-address;
Home Agent address (or address range);
Correspondent Node home address;
Correspondent Node care-of-address;
Packet category (identifying whether or not various Mobile IP (or other) modes of communication or Mobile IP itself applies to a packet and if so how);
Transport protocol;
Mobile Node side port number;
Correspondent Node side port number.

A policy rule may also comprise a priority value which identifies to the policy enforcement function the priorities with which the policy rules are to be applied.

According to a second aspect of the present invention there is provided a node for use within a communication network, the node comprising:
means for receiving addressing information relating to a packet flow through the network, from a service level control function;
policy rules generating means maintaining or having access to service and mobility policies for users of the communication system, and being arranged to generate a set of policy rules on the basis of said source and destination addressing information and the appropriate service and mobility policies; and
means for sending the generated set of policy rules to a policy enforcement function within the communication network.

BRIEF DESCRIPTION OF THE DRAWINGS

FIGS. 2 to 8 show IP packet header formats for a number of different routing schemes;

FIG. 11 illustrates the policy statements of FIG. 10 converted to a nine-tuple rule in the case of a packet flow associated with a Correspondent Node address falling within a given range;

FIG. 12 illustrates the policy statements of FIG. 10 converted to a nine-tuple rule in the case of a packet flow associated with a Correspondent Node address falling outside of a given range.

DETAILED DESCRIPTION OF CERTAIN EMBODIMENTS

Conventionally, the most important component of an IP flow specification is a five-tuple "vector" containing an (1) IP source address, (2) IP destination address, (3) an identification of the used transport protocol (e.g., TCP or UDP), (4) source port number and (5) destination port number. Some of these tuples may be wildcarded or specified as a range or prefix. Traffic associated with a Mobile IPv6 flow (either at one or both/all of the communicating peers) however, requires more IP addressing fields in order to describe a packet. A new nine-tuple rule for enforcement at the Policy Enforcement Function (PEF) is therefore proposed, consisting of the original five tuples (1) to (5) plus; (6) an inner IP source address, (7) an inner IP destination address, (8) a Home Agent address, and (9) a packet format.

Before describing further the current proposal, it is helpful to present an overview of the packet types that become available with the introduction of Mobile IPv6. Data packets transmitted on the access link of a MN (with or without Mobile IPv6) can take seven different formats. [Byte values where shown indicate the minimum IP header chain length not including the transport header.]

(#1) No MIPv6 Employed, L2 is Used for Home Tunneling

Uplink and downlink header formatting is shown in FIG. 2. Such packets are regular IP packets sent directly between the home networks of the MN and CN. The transport protocol is encoded in the inner header, unless IPv6 options are inserted between the transport header and the inner IP header. In this latter case, the transport protocol is stored in the last such option header. These packets are used when the MN is at home and communicates with the CN using regular IP packets using its home IP address directly.

(#2) No MIPv6 Employed, Local Address Used

Uplink and downlink header formatting is shown in FIG. 3. Such packets are regular IP packets sent directly between the MN and CN without going through the home network of the MN. Whilst such route optimization is possible, it does not provide any mobility support, i.e., if the MN moves, its care-of address changes and sessions with the CN will break. Such packets can be used if the MN is in a visited network, and uses its local address for communication, e.g., to download a webpage, to query a local DNS server, or to register at a local P-CSCF.

(#3) MIPv6 Employed by CN, Local Address Used

Uplink and downlink header formatting is shown in FIG. 4. Such packets are sent directly between the MN and CN without going through the home networks of either node. The MN uses its local address, while the CN uses MIPv6 route optimization. Similar to packet type #2, this mode of communication does not provide support for the movements of the MN. Such packets are used if the MN is in a visited network, and uses its local address for communication with a CN node that initiates MIPv6 route optimization.

(#4) No MIPv6 Bindings in MN or in CN

Figure 1:
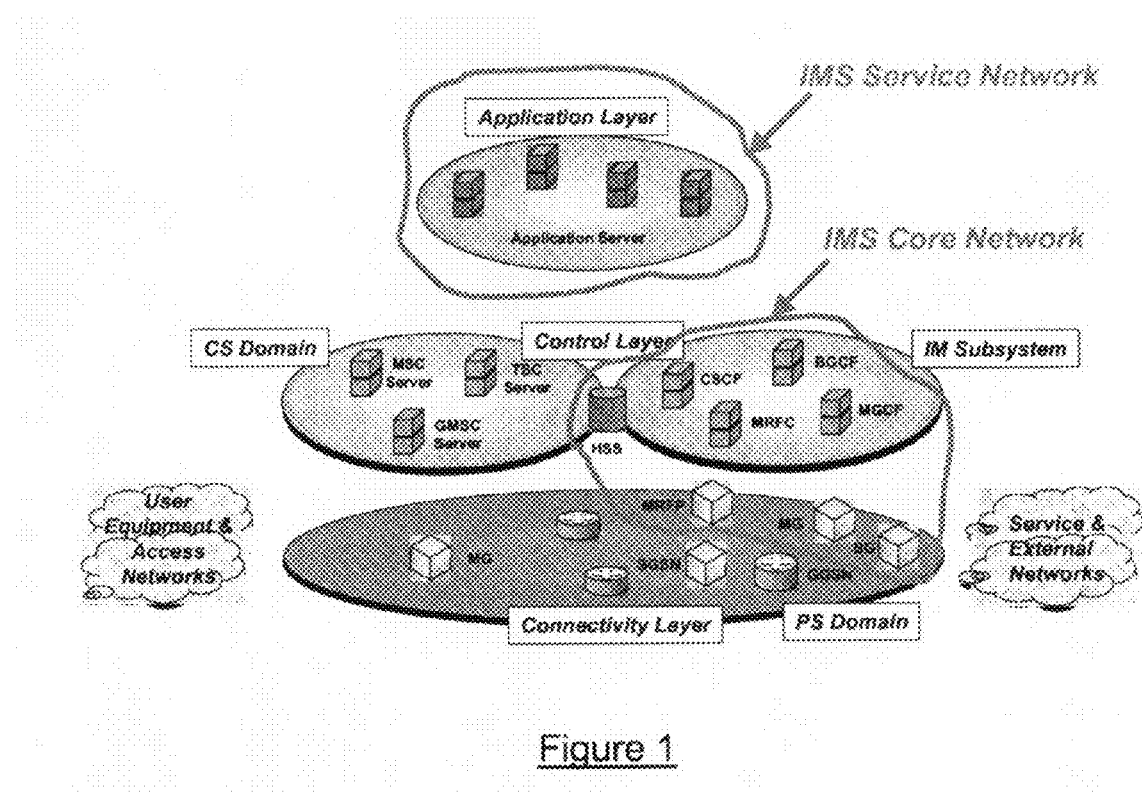
FIG. 1 illustrates schematically a 3GPP architecture in which Mobile Node access policy is enforced by an access router of a visited network.
Figure 5:
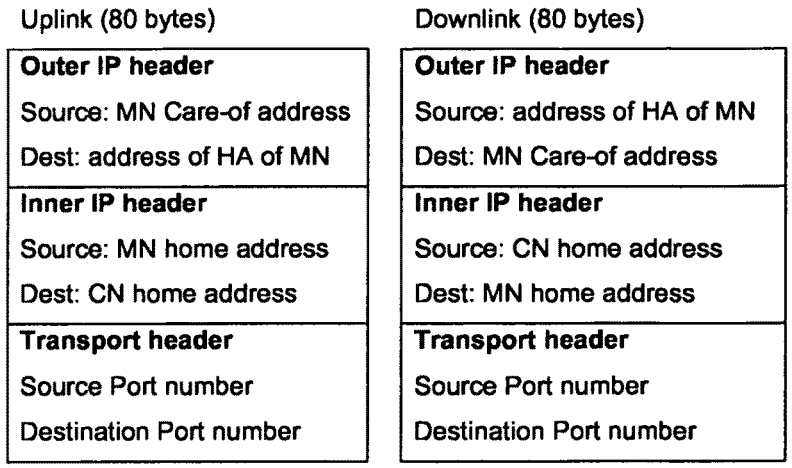

Uplink and downlink header formatting is shown in FIG. 5. Such packets are regular, non/route optimized MIPv6 packets, always passing through the Home Agent (HA) of both the Mobile Node (MN) and the Correspondent Node. In particular, on the access link of the MN, the packets always arrive from the HA of the MN. Such packets are used when the MN is in a visited network and uses its home address for communication, but where route optimization has not been activated.

(#5) Active Binding at MN Only

Figure 6:
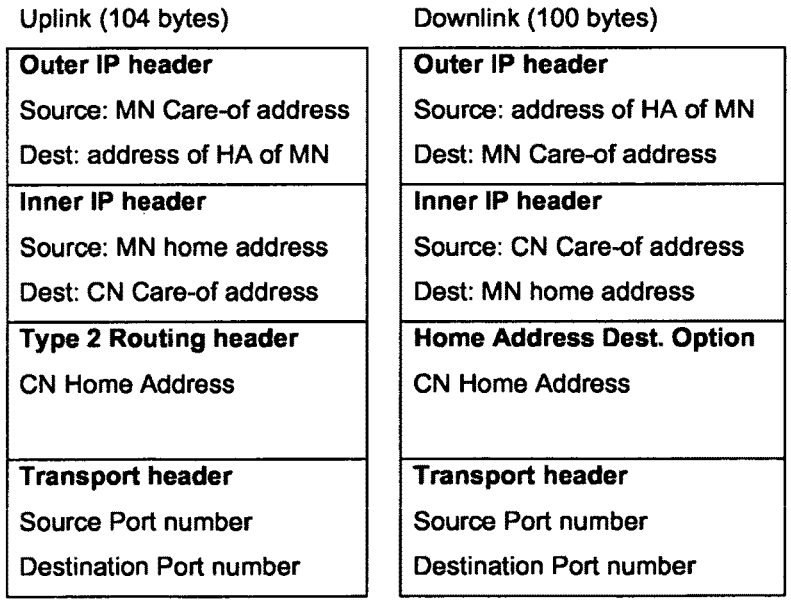

Uplink and downlink header formatting is shown in FIG. 6. Such packets are sent when the CN has initiated route optimization at the MN, but not the other way around. In this case, packets in both direction pass the HA of the MN, but not the HA of the CN. Such packets are used only when both the MN and CN are MIPv6 aware and are away from home, and when the MN does not use MIPv6 route optimization but the CN does.

(#6) Active Binding at CN Only

Figure 7:
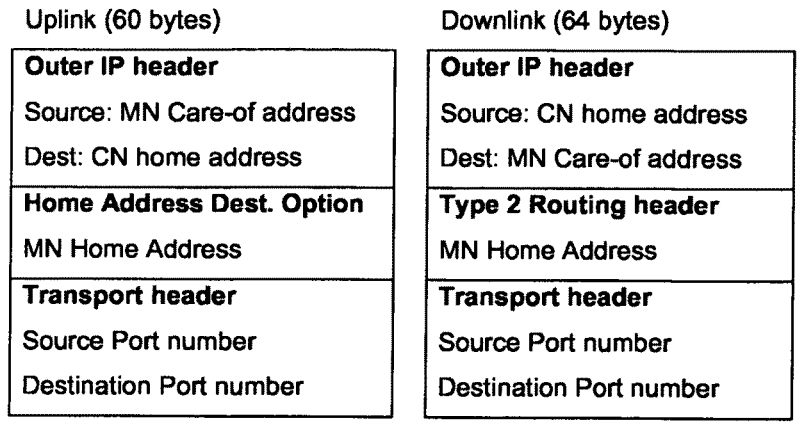

Uplink and downlink header formatting is shown in FIG. 7. Such packets are sent when the MN has initiated route optimization at the CN, but not the other way around. In this case, packets in both direction pass through the HA of the CN, but not the HA of the MN, hence one less tunnel header is present. Such packets are used if the MN is away from home and uses MIPv6 route optimization, but the CN does not.

(#7) Active Binding at Both MN and CN

Figure 8:
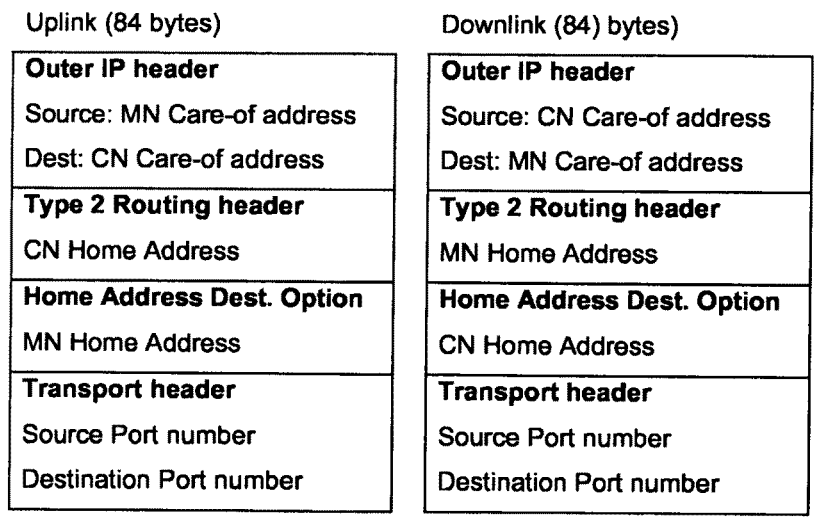

Uplink and downlink header formatting is shown in FIG. 8. Such packets are used if both the MN and CN are away from home and use MIPv6 route optimization.

The above packet types result from the introduction of Mobile IPv6. Additional packet types may occur if the terminal uses:

Hierarchical Mobile IPv6 [HMIPv6];
Fast Mobile IPv6 [FMIPv6];
Mobile IPv6 for IPv4 applications (as defined in [MIPv6v4]);
Mobile IPv4;
any other tunneling protocol;
a combination of one or more of the above.

However, for simplicity of explanation, we assume only "simple" Mobile IPv6 use in the following discussion.

Figures 9, 10:
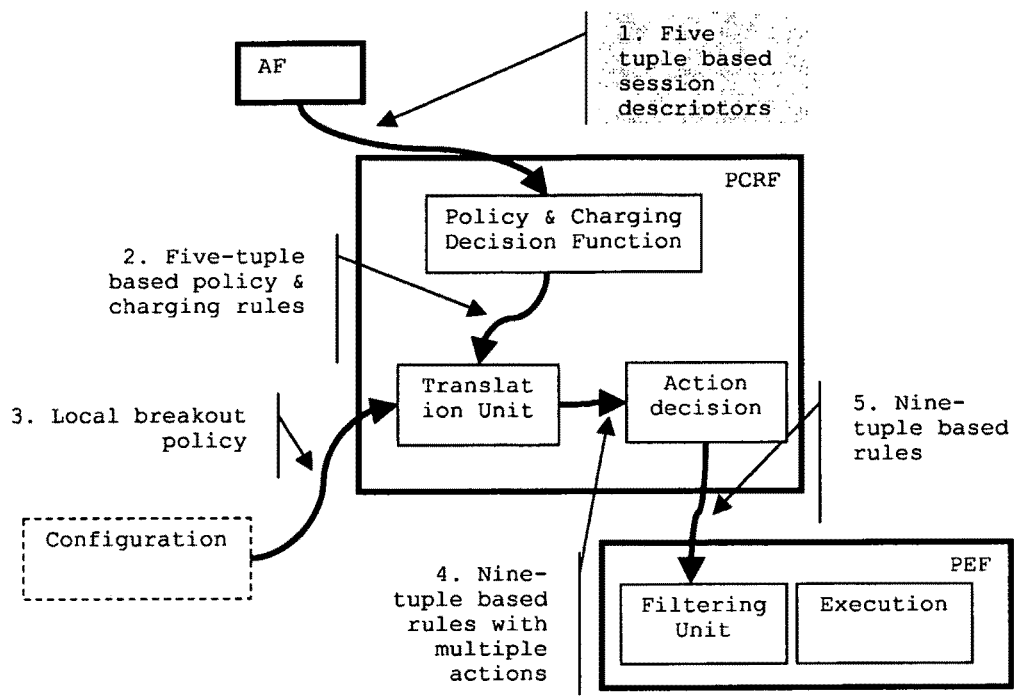
FIG. 9 illustrates schematically a policy enforcement architecture within a 3G network.
FIG. 10 illustrates a mobility policy expressed as a list of policy statements.

FIG. 9 illustrates schematically an assumed network architecture for implementing policy and charging operations. The Figure shows an Application Function (AF), a policy and Charging Control Function (PCRF), and a Policy Enforcement Function, as well as information flows between the functional units. In the case of IMS and 3GPP, the AF is located at the P-CSCF, the PCRF may be a standalone node, and the PEF may be located at the GGSN. The operation of the AF is unchanged with respect to the conventional operation. In particular, the AF is unaware of any mobility scheme implemented for a MN. The AF passes a five-tuple vector to the PCRF as required. For example, at setup of a voice call over the IP Multimedia Subsystem (IMS), the P-CSCF acting as AF will pass to the PCRF the home address and port number of the originating user and the home address and port number of the called party, as well as an identification of the used transport protocol. The PCRF will identify the appropriate service and mobility policies to be applied for one or both of the originating and called parties.

The PCRF will first apply the service policy to the five-tuple vector to generate a set of five-tuple rules relating to the QoS, charging, etc, to be applied to the relevant packet flow. This process is performed within a Policy and Charging Decision Function of the PCRF. The five-tuple rules generated by this function are then provided to a Translation Unit also implemented at the PCRF. The Translation Unit applies the mobility policy specified for the user to the received rules, and produces a new set of rules each comprising a nine-tuple filter part plus an action part. Determination of the action part may involve resolving conflicts between the service rules and the mobility policy.

A network operator can specify the mobility policy for particular users. Such a policy can be dynamic or static and can apply to individual subscribers or to a class of subscribers, and may be defined by the home operator of the subscriber or by the visited operator or both. A mobility policy can:

allow or deny the use of certain packet types towards a set of CN home addresses;
allow or deny the use of certain packet types towards a set of CN care-of addresses; and
allow or deny the use of certain packet types towards a set of Home Agent (HA) addresses (here HA refers to the HA of the MN and not the CN).

Using such building blocks, operators can effectively control the availability of route optimisation by, for example, disabling packet types where the MN attempts to use route optimization. Operators may limit the use of Mobile IP to a set of Home Agents such that it becomes impossible for the MN to use a HA other than that provided by the its home network.

Mobility policy can also dictate more complex behaviour for certain types of traffic. That is, instead of drop or allow type actions, the policy can express a change in charging or QoS. For example, to apply an improved QoS towards home tunneled traffic if the HA is provided by the home network or to allow Mobile IP related traffic to be charged at a different rate.

In more detail, the PCRF receives the five-tuple vector from the AF containing the following values (specified as actual values, ranges, etc) for flow specifications:

1. MN IP address
2. CN IP address
3. Transport protocol
4. MN side port number
5. CN side port number Additionally, the Translation Unit must have the following information about each MN:

6. MN CoA
7. Service policy for the subscriber
8. Mobility policy for the subscriber Exactly how the Translation Unit learns the MN CoA and the service and mobility policies is not important for the purpose of this discussion. However, these might be learnt from other MN related activities, such as PDP context establishment. The policies might alternatively be learnt from a Subscriber Policy Repository, or might be general policies that is manually configured at the PCRF and which is applicable to all users. For the mobility policy, a combination can also be used, e.g., CN related fields are taken from a global policy whereas HA addressing information is subscriber specific.

The Policy and Charging Decision Function applies the service policy to generate a set of five-tuple service policy rules. The translation unit then applies the appropriate mobility policy to the service policy rules. For each mobility policy "statement", the Translation Unit performs the following steps for each five-tuple rule:

1. If the CN IP address of the five-tuple is outside the range specified by the CN home address field of the local breakout policy rule, then no rule is generated. (Algorithm exits and starts over for the next rule in the local breakout policy.)

2. Copy the MN IP address and CN IP address fields of the five tuple to the MN home IP address field of the nine tuple rule.
3. Copy port numbers and transport protocol type to the corresponding nine-tuple fields.
4. Fill in the MN care-of address field of the nine-tuple rule.
5. Copy the address of Home Agent (HA) of the MN, CN care-of address, and packet type fields from the local breakout policy rule to the corresponding nine-tuple fields.
6. The translator unit attaches the action or priority (or any other information) specified in the local breakout policy rule into the corresponding field of the nine-tuple vector.

With this, the translation process is complete.

By way of example, assume that the mobility policy of the operator can be expressed as:
restrict the MN to use only a single HA (X); and
allow local breakout only towards a set of destinations (Y-Z).

Such a policy can be expressed as a list of policy statements as shown in FIG. 10. For a given MN home address and care-of-address, the remaining fields of each policy statement can be used as follows:

The CN home address may be used to limit modes of communication with that CN to home tunneling only or route optimized only (and the same for the reverse direction). The CN home address identifies the CN node irrespective of its current location (assuming a mobile CN). If for example the CN is in the network of the home operator of the MN, route optimisation is not necessary as home tunneling will mean optimal routing anyway, so forbidding route optimisation for such CNs is desirable.

The CN care-of address, in contrast, allows specifying rules based on the location of the CN. For example, if the operator of the MN does not trust the operator which is currently serving the (mobile) CN, it may want to inspect all traffic from that CN and therefore forbidding route optmisation is desirable.

The packet format identifies the actual mode of communication employed when sending a packet. If certain modes need to be forbidden/allowed, this field can be used to express which modes the action part of the mobility policy statement shall be applied to.

The Home Agent (HA) address can be used to limit the HA which the MN may use. For example, if the home operator assigns a HA and wants the MN to use this HA exclusively, it may block all home tunneled packets to/from any other HA.

Assume now that the AF provides the Translation Unit with the following five-tuple vector:
MN address: A-MN
CN address: A-CN
MN port: P-MN
CN port: P-CN
Transport protocol: T and assume that the care-of address of the MN is AC-MN, and is known to the Translation Unit. The Policy and Charging Decision Function applies the appropriate service policy to this vector to generate one or more service policy rules. Assume that the service policy is to allow the corresponding IP packet flow, and that a single service policy rule is generated comprising the five-tuple vector as filter part and allow as action part. Then, if A-CN falls into the range Y-Z, the Translation Unit generates the set of nine-tuple rules illustrated in FIG. 11. If A-CN does not fall into the range Y-Z, the Translation Unit generates the nine-tuple rules shown in FIG. 12. The "Priority" field indicates the order in which the rules are to be applied by the PEF. If a higher priority rule is implemented for a given service policy rule, lower priority rules for that service policy rule are ignored.

As already described, the PCRF installs the generated nine-tuple rules into a Filtering Unit of the PEF. The Filtering Unit parses through the header chains of incoming packets up to the transport header and, specifically, checks for encapsulated inner headers, Type 2 Routing headers and Home Address destination options. [Additional options and headers may also be searched.] By matching the found headers and the type of L2 tunneling to the patterns above, the Filtering Unit:
1. decides which category a packet belongs to;
2. extracts the addressing information; and
3. generates a nine-tuple vector for the packet.

Of course, some packets will not result in specific data for all of the fields of a nine-tuple vector. For example, in the case of a packet of type #7 (both the MN and CN have bindings), the MN's home agent address will not be known from the packet header. Fields for which no specific data can be generated are filled with an "all address matches" wildcard. The Filtering Unit then identifies those of the installed policy rules which apply to the packet, and enforces the respective actions.

Figure 13:
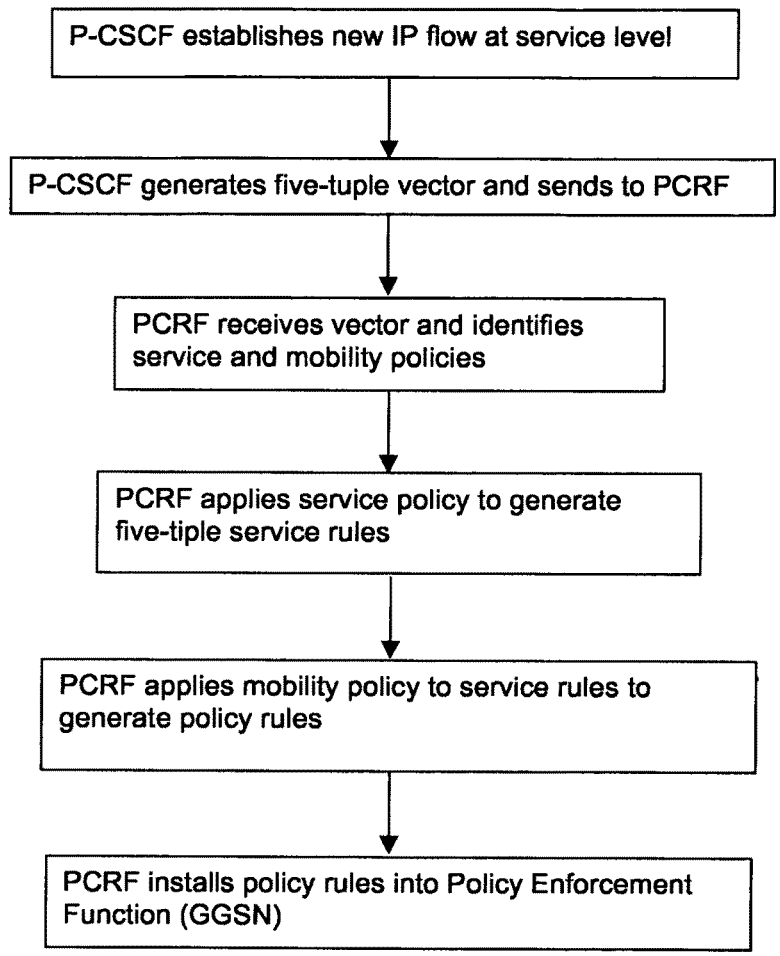
FIG. 13 is a flow diagram illustrating a method of generating policy rules for an IP flow.

The flow diagram of FIG. 13 illustrates in very general terms this process of generating and distributing a policy rule set.

It is possible for the Filtering Unit to combine multiple such rules to a single rule. For example, if the AF sends a second five-tuple vector to the translation unit (e.g. identifying a second voice call), a "Drop" rule very similar to the last rule in the tables of FIGS. 11 and 12 would be created. The two rules (for the first and second IP flows) could be combined to a universal "Drop rule" with CN HoA, transport protocol and port numbers set to <any>.

The embodiments described here enable fine grained (flow level) policy control, even where packets can be encapsulated in variety of different formats due to MIPv6 availability. The embodiments enable the use of detailed policies for various Mobile IP packet formats. Control of the use of care-of addresses for direct communication, and the use of HA addresses by a MN for home tunneling, are also possible.

We note that the invention can be extended to handle policy enforcement in scenarios where IPv4 traffic is carried in IPv6 and/or where IPv6 is carried over IPv4 transport (where IPv4 packet headers are encapsulated within an outer IPv6 header and vice versa). In these cases, the rules implementing service and mobility policy may contain more than nine values, with some of the IP addresses being IPv4 addresses rather than IPv6 addresses.

The mechanism may be extended to cover the use of HMIPv6. HMIPv6 provides for the introduction of a second (or further) Home Agent into the routing architecture. The MN informs its "primary" HA that its care-of-address is the address of the second HA. As long as the MN is within the domain of the second HA, that HA acts as a regional HA with the MN notifying the second HA of its current actual care-of-address.

It is noted that fields other than those contained in the conventional five-tuple vector can be provided by the AF to the PCRF in order to create the rules supplied to the PEF. For example, the Type-of-Service (ToS) or DiffServ field of the IP header can also be part of the input filter specification (making it "six-tuple"). Such additional fields are, however, not modified by Mobile IPv6 and the translation process, so they can be simply added to the resulting nine-tuple vectors of the rule filters (making it ten-tuple). Conversely, all five fields of the five-tuple vector may not be required as inputs to the rule generation function. For example, IPSec tunnel mode uses the Security Parameter Index (SPI) to demultiplex incoming packets, rather than port numbers. In this case, the vector provided by the AF would be a "four-tuple" vector (2 IP addresses, transport protocol identifier (=IPSec tunnel mode) and the SPI), and the resulting nine-tuple vectors of the rule filters would be reduced to an eight-tuple vectors.

It will be appreciated by the person of skill in the art that various modifications may be made to the above described embodiments without departing from the scope of the present invention. For example, whilst a primary application of the invention relates to mobility handling, fixed accesses networks can also benefit.

The invention claimed is:

1. A method of generating and applying a set of policy rules for enforcement by a policy enforcement function at a node of a communication network, said node routing Mobile Internet Protocol version 6 (MIPv6) packet flows to and from users of the network, the method comprising:
   at a service level control function, determining source and destination addressing information for a MIPv6 packet flow to be transported through said node;
   sending said determined addressing information to a policy rules generating function, the policy rules generating function maintaining or having access to service and mobility policies for users of the communication network;
   at the policy rules generating function, generating said set of policy rules on the basis of the source and destination addressing information and the appropriate service and mobility policies, the rules specifying a route optimization policy, wherein the policy rules generating function comprises a first part for applying said service policies to the received addressing information to generate a set of service rules, and a second part for applying the mobility policy to the service rules to generate the set of policy rules, wherein the second part extends the service rules to take into account MIPv6 addressing formats;
   sending the generated set of policy rules to the policy enforcement function; and
   applying by the policy enforcement function, the set of policy rules to traffic flows to determine whether or not route optimization is allowed, wherein the policy rules enable the policy enforcement function to filter MIPv6 packet flows based on four IP addresses in MIPv6 packet headers.

2. The method according to claim 1, wherein said service policy is a policy which takes no account of mobility.

3. The method according to claim 1, wherein said mobility policy defines access rights to Mobile IP for a plurality of users.

4. The method according to claim 1, wherein said mobility policy specifies for a user, Correspondent Nodes with which the user is permitted to employ route optimization.

5. The method according to claim 1, wherein said mobility policy specifies Home Agents via which a user is permitted to route Mobile IP traffic.

6. The method according to claim 1, wherein said mobility policy specifies packet types which are permitted to be used with Mobile IP.

7. The method according to claim 1, wherein said service level control function is located within a node of an IP Multimedia Subsystem, and the policy enforcement function is located with a Gateway GPRS Support Node (GGSN) of a cellular telephone network.

8. The method according to claim 1, wherein said source and destination addressing information provided by the service level control function comprises at least the source and destination addresses of the packet flow.

9. The method according to claim 8, wherein said addressing information also comprises source and destination port numbers.

10. The method according to claim 1, further comprising sending from the service level control function to the policy rules generating function, an identification of a transport protocol utilized for the traffic flow, the policy rules generating function using knowledge of the transport protocol to generate the policy rules.

11. The method according to claim 1, wherein said service rules include source and destination address information for the IP flow, while each policy rule includes the home and care-of-address of the user for whom a policy is being applied, Correspondent Node home and care-of-addresses or address ranges, and an action for packets matching these address conditions.

12. The method according to claim 1, wherein a policy rule specifies allowed or disallowed Home Agent addresses and packet types.

13. The method according to claim 1, wherein a policy rule includes the following fields:
   Mobile Node home address;
   Mobile Node care-of-address;
   Home Agent address (or address range);
   Correspondent Node home address;
   Correspondent Node care-of-address;
   Packet category identifying whether or not Mobile IP applies to a packet and if so, in what manner Mobile IP applies;
   Transport protocol;
   Mobile Node side port number; and
   Correspondent Node side port number.

14. The method according to claim 1, wherein a policy rule includes a priority value which identifies to the policy enforcement function the priorities with which the policy rules are to be applied.

15. A node for use within a communication network, the node including a processor coupled to a non-transitory memory, wherein when the processor executes computer program instructions stored in the memory, the processor causes the node to:
   receive from a service level control function, addressing information relating to a Mobile Internet Protocol version 6 (MIPv6) packet flow through the network;
   access service and mobility policies for users of the communication network, and generate a set of policy rules based on source and destination addressing information and the appropriate service and mobility policies, the rules specifying a route optimization policy;
   wherein the node is configured to apply the service policies to the received addressing information to generate a set of service rules, and to apply the mobility policy to the service rules to generate the set of policy rules, wherein the service rules are extended to take into account MIPv6 addressing formats; and
   send the generated set of policy rules to a policy enforcement function within the communication network, wherein the policy rules enable the policy enforcement function to filter MIPv6 packet flows based on four IP addresses in MIPv6 packet headers.

* * * * *